(12) United States Patent
Sekiguchi (10) Patent No.: US 6,707,605 B2
(45) Date of Patent: Mar. 16, 2004

(54) FRESNEL LENS SHEET AND TRANSMISSION-TYPE PROJECTION SCREEN

(75) Inventor: Hiroshi Sekiguchi, Tokyo (JP)

(73) Assignee: Dai Nippon Printing Co., Ltd., Tokyo-To (JP)

( * ) Notice: Subject to any disclaimer, the term of this patent is extended or adjusted under 35 U.S.C. 154(b) by 0 days.

(21) Appl. No.: 10/146,122

(22) Filed: May 15, 2002

(65) Prior Publication Data

US 2002/0171930 A1 Nov. 21, 2002

(30) Foreign Application Priority Data

May 17, 2001 (JP) ........................................ 2001-147221
Dec. 12, 2001 (JP) ........................................ 2001-378045

(51) Int. Cl.[7] ........................ G03B 21/56; G03B 21/60; G02B 3/08
(52) U.S. Cl. ........................ 359/443; 359/457; 359/742
(58) Field of Search ................................ 359/443, 457, 359/742

(56) References Cited

U.S. PATENT DOCUMENTS

| 5,513,036 | A  | * | 4/1996 | Watanabe et al. | ........... 359/457 |
| 6,031,664 | A  | * | 2/2000 | Goto | ........................ 359/457 |
| 6,400,504 | B2 | * | 6/2002 | Miyata | ........................ 359/457 |

* cited by examiner

*Primary Examiner*—Christopher Mahoney
(74) *Attorney, Agent, or Firm*—Timothy J. Keefer; Wildman, Harrold, Allen & Dixon LLP (57) ABSTRACT

A Fresnel lens sheet of the present invention is applicable to a transmission-type projection screen, which comprises a layered structure provided with at least a base material layer, a lens layer formed into a Fresnel lens configuration, an incident surface on which projection light is incident and an light-emission surface from which the projection light is emitted, wherein a total reflection surface is disposed in the layered structure at a position between the incident surface and the light-emission surface, the total reflection surface totally reflecting a portion of projection light proceeding on an optical path in a direction from the lens layer side toward the base material layer side.

16 Claims, 12 Drawing Sheets

FRESNEL LENS SHEET AND TRANSMISSION-TYPE PROJECTION SCREEN

BACKGROUND OF THE INVENTION

1. Field of the Invention

The present invention relates to a Fresnel lens sheet, and also to a transmission-type projection screen which utilizes the Fresnel lens sheet.

2. Description of the Related Art

A Fresnel lens sheet and a transmission-type projection screen are generally used in order that projection light incident on an incident surface is polarized and emitted from an light-emission surface at a desired angle.

However, a portion of the projected light is reflected at the light-emission surface and eventually emitted from a position which is slightly dislocated from the position where the light should be emitted, resulting in generation of a what is called double image.

Figure 11:
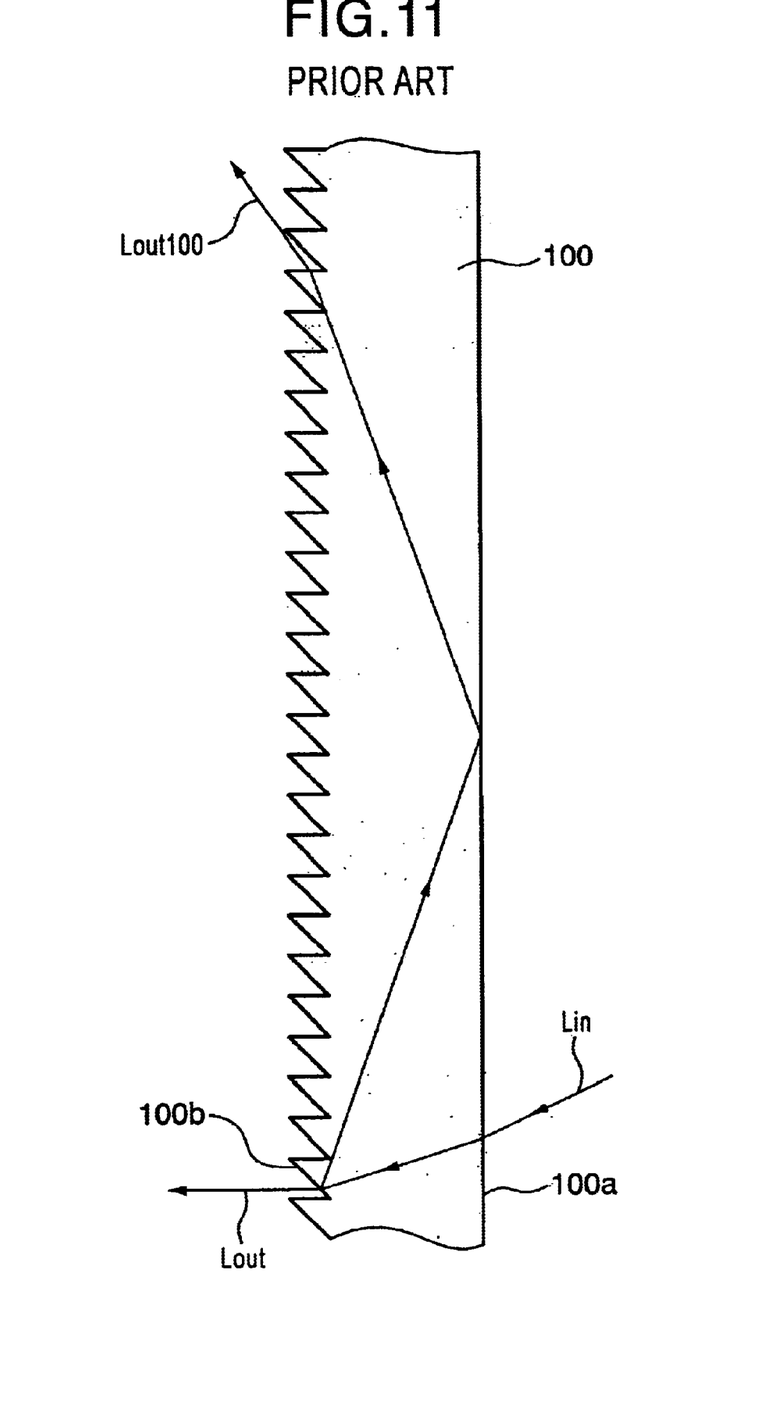
FIG. 11 is a view which shows an optical path of light incident on a conventional Fresnel lens sheet 100.
Figure 12:
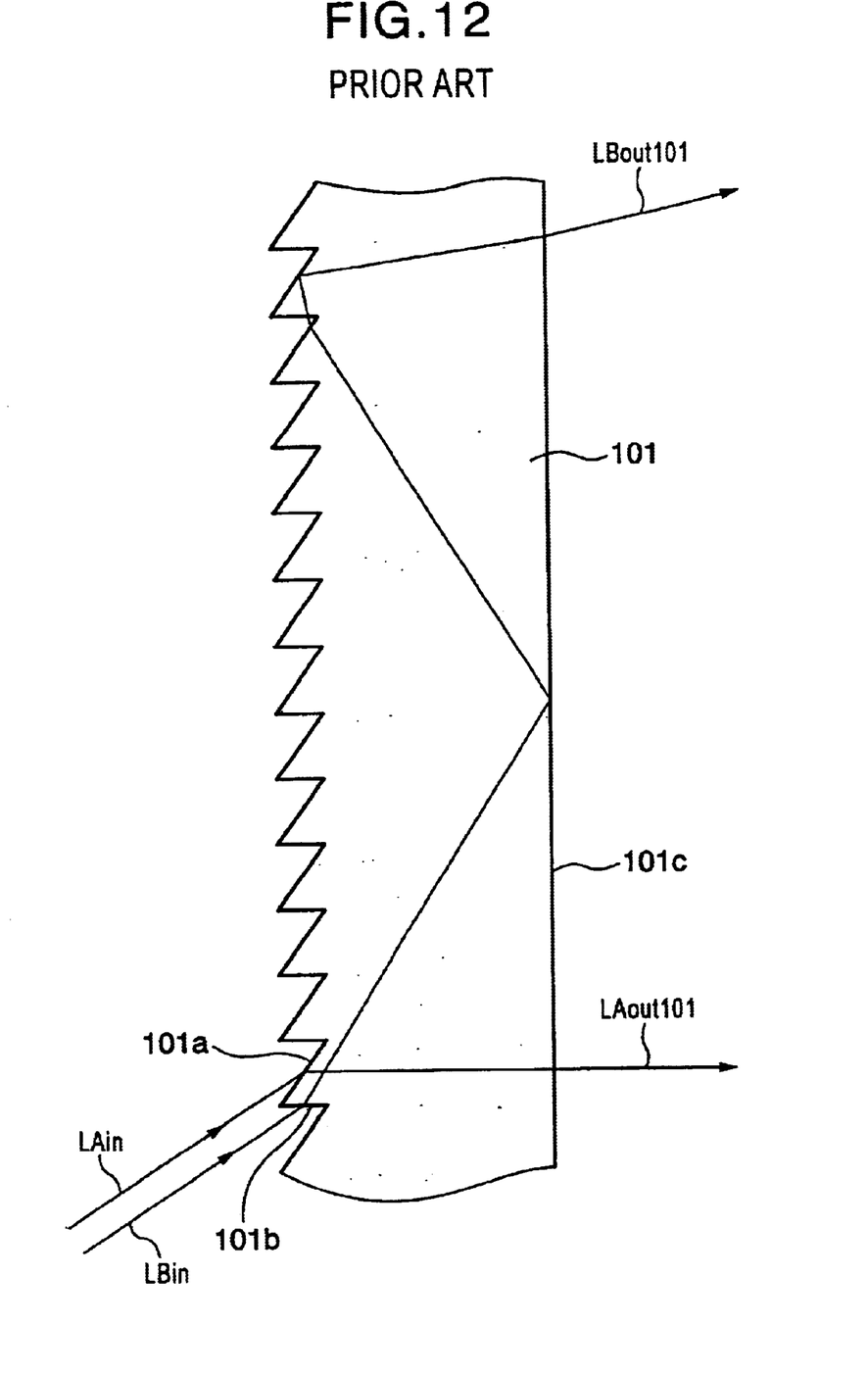
FIG. 12 is a view which shows an optical path of light incident on a conventional Fresnel lens sheet 101.

FIGS. 11 and 12 are drawings which show an optical path of light which is incident on a conventional Fresnel lens sheet 100 or 101.

Most of an incident light $L_{in}$ which is incident on the Fresnel lens sheet 100 of FIG. 11 is emitted from a light-emission surface 100b as a normal emission light $L_{out}$. However, a portion of the incident light $L_{in}$ is reflected back at the light-emission surface 100b, entirely reflected at an incident surface 100a and becomes a disoriented light $L_{out100}$. Since the disoriented light $L_{out100}$ is emitted from a position which is distanced from the normal emission light $L_{out}$, the resulting image is observed as a double image.

Further, an incident light $LA_{in}$ which is incident on the incident surface 101a of the Fresnel lens sheet 101 of FIG. 12 is emitted from a light-emission surface 101c as a normal emission light $LA_{out101}$. However, an incident light $LB_{in}$ which is incident on an ineffective surface 101b is reflected back at a light-emission surface 101c, subjected to inner surface reflection and becomes a disoriented light $LB_{out101}$. Since the disoriented light $LB_{out101}$ is emitted from a position which is distanced from the normal emission light $LA_{out101}$, the resulting image is observed as a double image.

Therefore, the Fresnel lens sheet 100 or 101 is conventionally made thin so that the length of the optical path of the light reflected back at the light-emission surface 100b or 101c is shortened, in order that the distance between the position where the emission light $L_{out}$ is emitted and the position where the disoriented light $L_{out100}$ is emitted, as well as the distance between the position where the emission light $LA_{out101}$ is emitted and the position where the disoriented light $LB_{out101}$ is emitted, are made closer. By such modification, the double image can be made less conspicuous as compared with the unmodified Fresnel lens sheet.

SUMMARY OF THE INVENTION

However, in the conventional Fresnel lens sheet as described above, as the thickness thereof is made thin, there arises a problem that the Fresnel lens sheet exhibits poor self-supporting property and cannot be held easily when the Fresnel lens sheet is used for a screen of large-size.

Examples of a method of holding a thin Fresnel lens sheet include a method of applying tension to a Fresnel lens sheet. However, this method has drawbacks in that the method requires provision of specific members for applying tension to a Fresnel lens sheet and that the size of the portion thereof other than the display of the back-projection-type screen increases, which results in an increase in the production cost.

Further, there also arises a problem that the holding frame for holding the Fresnel lens sheet must have a width of several tens of mm. In a multi-display device which effects multi-displaying faces or an enlarged displaying face by stacking up a plurality of transmission-type (or a back-projection-type in other word) projection screens, especially, there arises a problem that connection portions having a width of tens of mm, at which image cannot be displayed, are inevitably generated between the displays because the width of the holding frame cannot be reduced any further.

An object of the present invention is to provide a Fresnel lens sheet and a transmission-type projection screen which can be easily held and exhibits less conspicuous double image as compared with the conventional Fresnel lens sheet.

The present invention solves the above-mentioned problems by means for solution as described below. Although the embodiments of the present invention are described with corresponding reference numerals attached thereto, these reference numerals by no means restrict the present invention.

Specifically, a first aspect of the present invention provides a Fresnel lens sheet (10, 20, 30, 40, 50) for polarizing and emitting projection light, comprising: a lens layer (11, 21, 31, 41, 51) at which Fresnel lens configuration has been formed; a base material layer (12, 22, 32, 42, 52) provided further toward a light-incident or light-emission side than the lens layer; and a total reflection surface (11a, 23a, 31a, 40a, 50a) for totally reflecting a portion of the projection light, wherein the total reflection surface is disposed between an incident surface (12a, 22a, 32a, 41a, 51a) and a light-emission surface.

In the first aspect of the Fresnel lens sheet (10, 20, 30, 40, 50), a disoriented light originated from a part of the projection light incident on the incident surface which may be a surface of the base material layer or the lens layer is totally reflected by the total reflection surface (11a, 23a, 31a, 40a, 50a), when the disoriented light proceeds in a direction from the lens layer side toward the base material side. That is, the disoriented light is originated when the projection light passes through or is reflected back by the surface with the Fresnel lens configuration of the lens layer, and proceeds in a direction from the lens layer side toward the base material side, and thus reaches the total reflection surface, at which the disoriented light is subjected to the total reflection.

In the first aspect, an optical path of the disoriented light in the Fresnel lens sheet is shortened, because the disoriented light is reflected back by the total reflection surface before it proceeds across an entire thickness of the Fresnel lens sheet. Accordingly, an extent of the double image can be reduced, even if thickness of the Fresnel lens sheet is made large to increase the self-standing property, thus providing a Fresnel lens sheet with a good self-standing and a reduced double image.

A first embodiment, which realizes the above-mentioned first aspect of the present invention, provides a Fresnel lens sheet (10, 20, 30) comprising: a base material layer (an incident layer) (12, 22, 32) provided as a layer having an incident surface; a lens layer (11, 21, 31) at which a Fresnel configuration has been formed; and a total reflection surface (11a, 23a, 31a) for totally reflecting a portion of projection light reflected at a light-emission surface (11b, 21b, 31b), wherein the total reflection surface is disposed between the incident surface (12a, 22a, 32a) and the light-emission surface. According to the first embodiment of the present invention, generation of double image can be significantly suppressed, even when the base material is relatively thick. As a result, a Fresnel lens sheet which is easily held and in which double image is not so conspicuous can be obtained.

In the above-mentioned first embodiment, the Fresnel lens sheet (10, 20, 30) may comprise: a low refractive index layer (12, 24, 33) having a predetermined refractive index; and a high refractive index layer (11, 23, 31) having a refractive index higher than the refractive index of the low refractive index layer, the high refractive index layer being adjacent to the light-emission side of the low refractive index layer, wherein the total reflection surface (11a, 23a, 31a) is a surface at which the low refractive index layer is in contact with the high refractive index layer. In this case, as the total reflection surface is a simply boundary surface at which the low refractive index layer is in contact with the high refractive index layer, production of the total reflection surface is significantly eased.

In the Fresnel lens sheet (10) of the above-mentioned first embodiment, the low refractive index layer may be provided as the base material layer (12) and the high refractive index layer may be provided as the lens layer (11). As a result, the present invention can be realized by a simple structure.

In the Fresnel lens sheet (10, 20, 30) of the above-mentioned first embodiment, the distance between the total reflection surface (11a, 23a, 31a) and the light-emission surface (11b, 21b, 31b) is preferably smaller than the distance between the total reflection surface and the incident surface (12a, 22a, 32a). As a result, generation of double image can be suppressed in an effective manner, while the strength of the Fresnel lens is reliably maintained.

In the Fresnel lens sheet (10-2) of the above-mentioned first embodiment, the total reflection surface (11-2a) may have a diffusion configuration constituted of minute projections and dents. As a result, generation of double image can be further suppressed.

In the Fresnel lens sheet (10-3) of the above-mentioned first embodiment, at least one (11-3) of the layers provided between the total reflection surface and the light-emission surface may include a diffusion material (D) which diffuses light. As a result, generation of double image can be further suppressed.

A second embodiment, which realizes the above-mentioned first aspect of the present invention, provides a Fresnel lens sheet (40, 50) comprising: a lens layer (41, 51) which is provided as a layer having an incident surface and at which a Fresnel configuration has been formed; a base material layer (42, 52) provided further toward the light-emission side than the lens layer; and a total reflection surface (40a, 50a) for totally reflecting a portion of projection light incident on the lens layer, the total reflection surface being provided between the incident surface (41a, 51a) and a light-emission surface. As a result, generation of double image can be suppressed regardless of the thickness of the lens layer, whereby a Fresnel lens sheet which is easily held and in which double image is not so conspicuous can be obtained.

In the above-mentioned second embodiment, the Fresnel lens sheet may be designed as a Fresnel lens (40, 50) in which the total reflection surface (40a, 50a) totally reflects a portion of the projection light incident on an ineffective surface (41b, 51b) of the lens layer. As a result, generation of double image can be suppressed regardless of the thickness of the lens layer, whereby a Fresnel lens sheet which is easily held and in which double image is not so conspicuous can be obtained.

In the above-mentioned second embodiment, the Fresnel lens sheet (40, 50) may comprise: a high refractive index layer (41, 51) having a predetermined refractive index; a low refractive index layer (42, 53) having a refractive index lower than the refractive index of the high refractive index layer, the low refractive index layer being adjacent to the light-emission side of the high refractive index layer, wherein the total reflection surface (40a, 50a) is a surface at which the high refractive index layer is in contact with the low refractive index layer. As a result, the total reflection surface can be easily produced.

In the Fresnel lens sheet (40) of the above-mentioned second embodiment, the low refractive index layer may be provided as the base material layer (42) and the high refractive index layer may be provided as the lens layer (41). As a result, the present invention can be realized by a simple structure.

In the Fresnel lens sheet (40, 50) of the above-mentioned second embodiment, the distance between the total reflection surface (40a, 50a) and the incident surface (41a, 51a) is preferably smaller than the distance between the total reflection surface and the light-emission surface. By designing the Fresnel lens sheet in such a manner, generation of double image can be effectively reduced, while the strength of the Fresnel lens is maintained.

In the Fresnel lens sheet (50-2) of the above-mentioned second embodiment, the total reflection surface (50-2a) may have a diffusion configuration constituted of minute projections and dents. As a result, generation of double image can further be reduced.

Further, the second aspect of the present invention provides a transmission-type projection screen provided with a Fresnel lens sheet, wherein the Fresnel lens sheet comprises a base material layer, a lens layer formed into a Fresnel lens configuration, a total reflection surface which is disposed at a position between an incident surface and an light-emission surface and totally reflects a portion of projection light which is incident on the incident surface disposed on either the lens layer side or the base material layer side, and proceeds in a direction from the lens layer toward the base material layer, and finally emitted from the light-emission surface, and wherein the Fresnel lens sheet is further comprises one diffusion means selected from the group consisting of a diffusion material added inside the Fresnel lens sheet, an interface between layers which constitute the Fresnel lens sheet formed into a projection-dent configuration, a light-emission surface formed into a rough face, and a light-emission surface formed into a lenticular configuration.

The above-mentioned transmission-type projection screen can be easily produced by using any of the aforementioned diffusion means.

DESCRIPTION OF THE PREFERRED EMBODIMENTS

The embodiments of the present invention will be described further in detail hereinafter, with reference to the accompanying drawings.

(First Embodiment)

Figure 1:
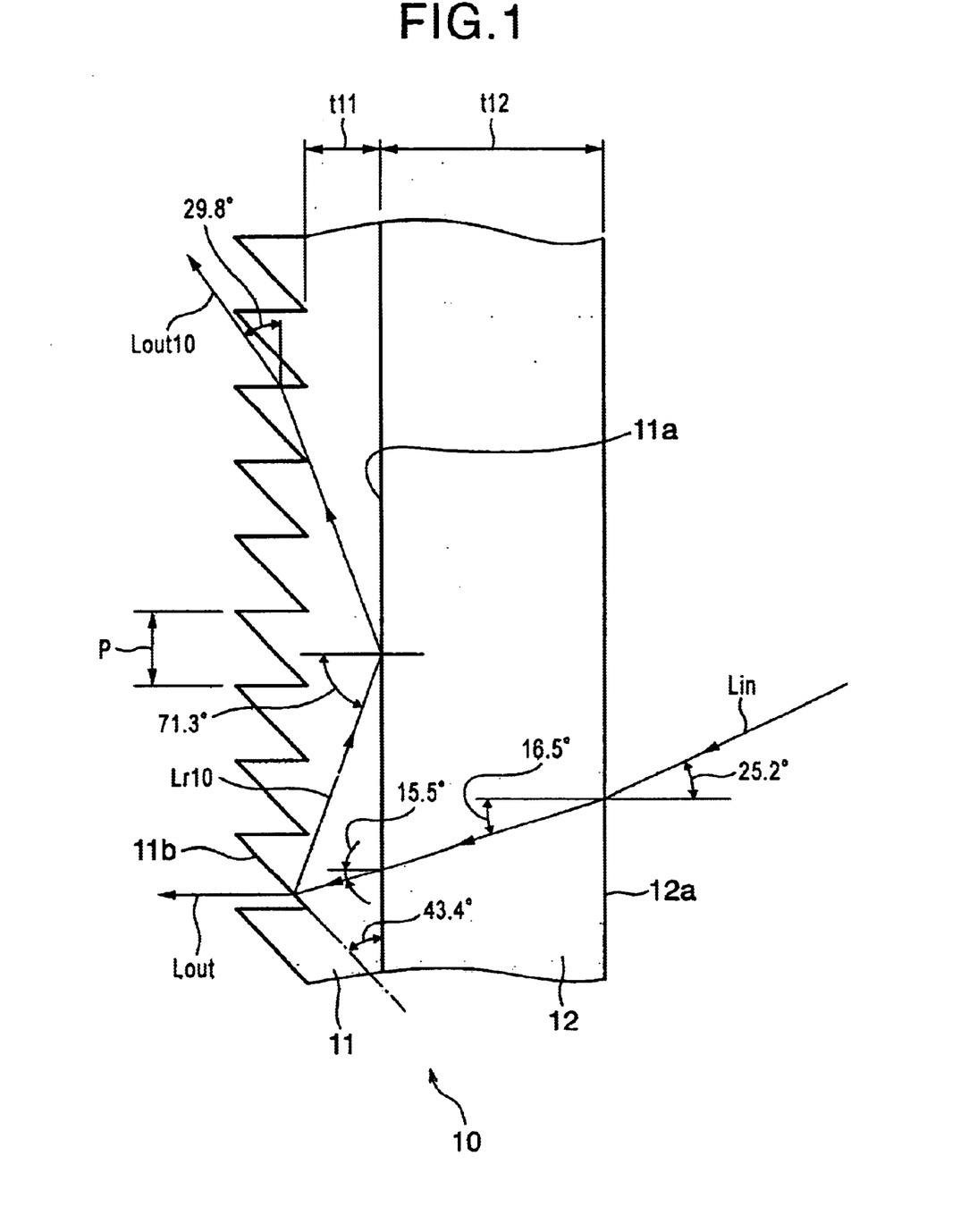
FIG. 1 is an explanatory view which shows one example of a first embodiment of a Fresnel lens sheet of the present invention.

FIG. 1 is an explanatory view which shows one example of a first embodiment of a Fresnel lens sheet of the present invention.

A Fresnel lens sheet 10 of the present embodiment has a lens layer 11 and a base material layer 12. The size across corners and the focal length of the Fresnel lens sheet 10 are 70 inches (aspect ratio being 4:3) and 720 mm, respectively.

A Fresnel lens configuration having pitch (P) of 0.1 mm is formed at the light-emission side of the lens layer 11, such that the lens layer 11 functions as a high refractive index layer having refractive index (n11) of 1.59. The thickness (t11) of the lens layer 11 measured from the bottom line of the notches thereof is 0.1 mm. The lens layer 11 has a total reflection surface 11a at the interface thereof with the base material layer 12.

The base material layer 12 is a parallel-extending flat plate made of acrylic resin whose plate thickness (t12) is 3 mm and the refractive index (n12) is 1.49, which functions as a low refractive layer. In FIG. 1, the plate thickness and the like of the lens layer 11 and the base material layer 12 are shown in a manner that the ratio thereof is appropriately increased/decreased, so that understanding of the description is facilitated (such modification of the ratio of the plate thickness and the like are also carried out, in a similar manner, in other drawings).

In a conventional Fresnel lens sheet having a structure similar to that of the Fresnel lens sheet 10 of the present embodiment, when imaging light is projected by a projector including a liquid crystal or a DLP (Digital Light Processor) at the projection distance of 850 mm, a double image is conspicuously generated especially at a position 400 mm below the center. Here, the optical path of the incident light in the Fresnel lens sheet 10 of the present embodiment is described by showing the optical path of the incident light at the above-mentioned position in FIG. 1.

The incident light $L_{in}$ is incident on the lens sheet at an incident angle of 25.2° at the position 400 mm below the center, when the projection distance is 850 mm. A portion $L_{r10}$ (reflected light) of the incident light $L_{in}$, which portion is reflected back at the light-emission surface 11b, is incident on the total reflection surface 11a at the angle of 71.3°.

Here, the critical angle of the total reflection surface 11a is determined in accordance with the refractive indexes of the lens layer 11 and the incident layer 12. In the case of the present embodiment, the critical angle is 69.57°. Therefore, the reflected light $L_{r10}$, which is incident on the total reflection surface 11a at the angle of 71.3°, is totally reflected at the total reflection surface 11a and then emitted as the disoriented light $L_{out10}$.

The degree of displacement between the light-emission position of the emission light $L_{out}$ and that of the disoriented light $L_{out10}$ is approximately 7 pitches (0.7 mm) and the resulting double image is hardly recognized. Further, as the incident layer 12 is sufficiently thick (t11+t12=3.1 mm), the Fresnel lens sheet 10 can be held or supported easily.

(Modification of the First Embodiment)

Figure 2:
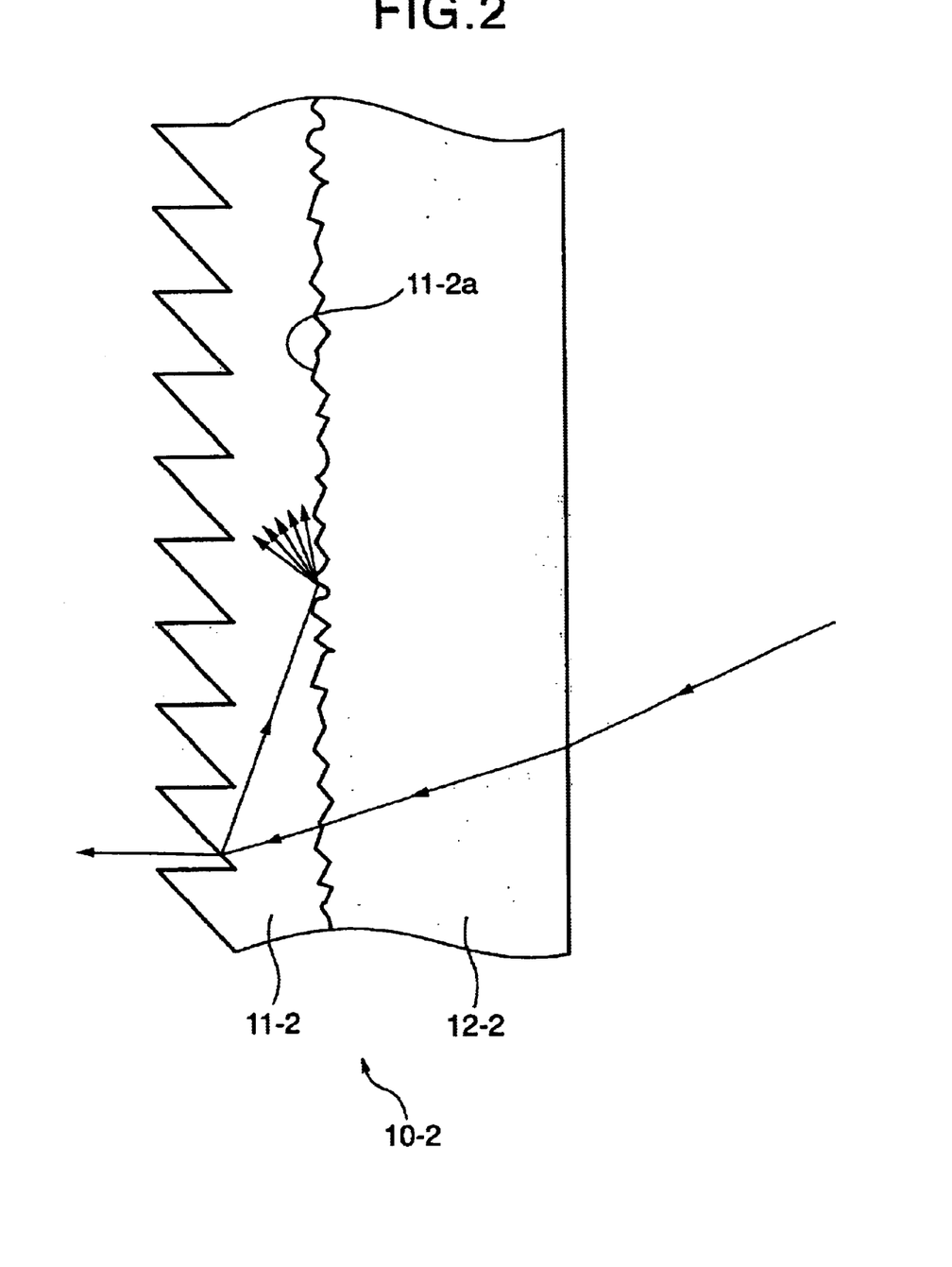
FIG. 2 is a view which shows a modification of the first embodiment.
Figure 3:
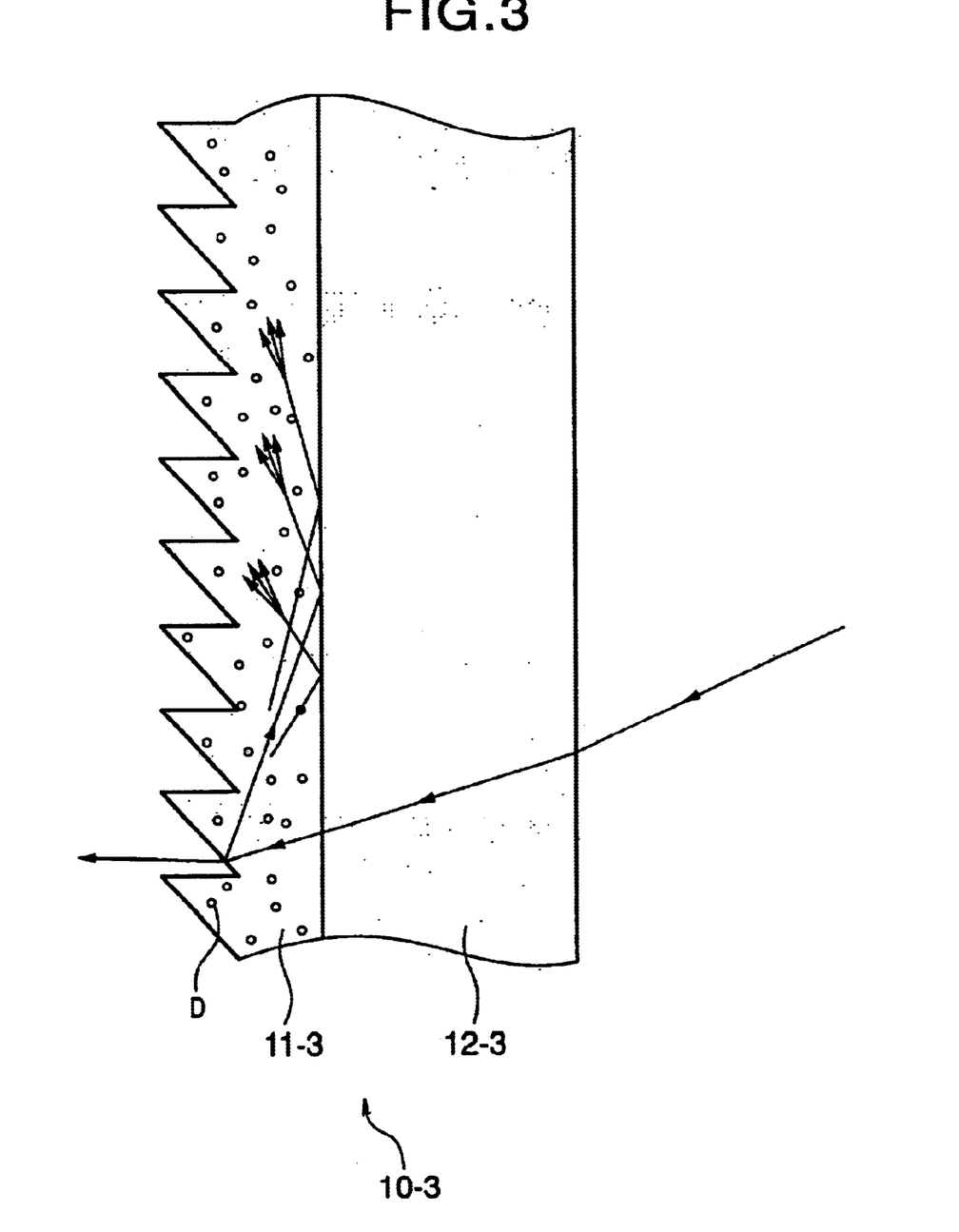
FIG. 3 is a view which shows the modification of the first embodiment.

FIGS. 2 and 3 are views which show a modification of the first embodiment. A Fresnel lens sheet 10-2 shown in FIG. 2 has a structure in which minute projections and dents are formed at an interface 11-2a between a lens layer 11-2 and a base material 12-2, so that the interface has a diffusion configuration. As a result, light which generates double image is diffused and the double image, if it is generated, is made further less conspicuous. A Fresnel lens sheet 10-3 shown in FIG. 3 has a structure in which a diffusion material D is included in a lens layer 11-3, so that light which generates double image is diffused and the double image, if it is generated, is made further less conspicuous.

By employing the structures of the Fresnel lens sheet 10-2, 10-3 or combining these structures in an appropriate manner, generation of double image can further be suppressed.

According to the present embodiment, as the lens layer 11 is designed as a high refractive index layer having small layer thickness and the incident layer 12 is designed as a low refractive index layer having large layer thickness, a Fresnel lens sheet which has high strength, can be held/supported easily, and in which double image is not conspicuous, can be obtained. Further, by providing the diffusion configuration and/or material thereto, the generation of double image can be further suppressed.

(Another Modification of the First Embodiment)

Figure 4:
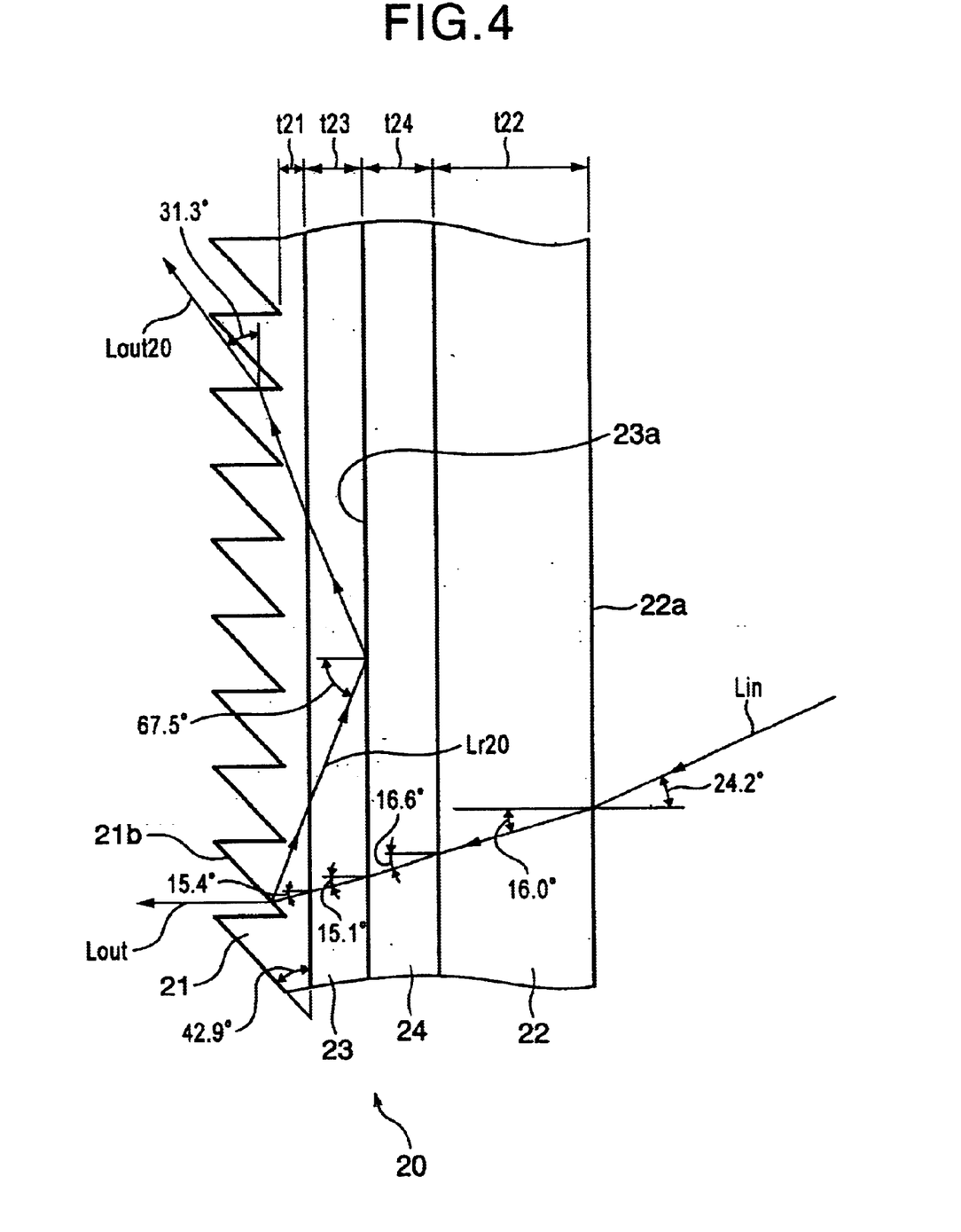
FIG. 4 is a view which shows another modification of the first embodiment of the Fresnel lens sheet of the present invention.

FIG. 4 is a view which shows another modification of the first embodiment of the Fresnel lens sheet of the present invention.

A Fresnel lens sheet 20 of the present embodiment includes a third layer 23 and a fourth layer 24 between a lens layer 21 and a base material layer 22. The size across corners and the focal length of the Fresnel lens sheet 20 are 70 inches (aspect ratio being 4:3) and 900 mm, respectively.

A Fresnel lens configuration having pitch (P) of 0.1 mm is formed at the light-emission side of the lens layer 21. The lens layer 21 has refractive index (n21) of 1.55. The thickness (t21) of the lens layer 21 measured from the bottom line of the notches thereof is 0.02 mm.

The base material layer 22 is a parallel-extending flat plate made of acrylic resin whose plate thickness (t22) is 3 mm and the refractive index (n22) is 1.49.

The third layer 23 is provided between the lens layer 21 and the fourth layer 24, has refractive index (n23) of 1.58 and layer thickness of 0.08 mm and functions as a high refractive index layer.

The fourth layer 24 is provided between the third layer 23 and the incident layer 22, has refractive index (n24) of 1.44 and layer thickness of 0.1 mm and functions as a low refractive index layer.

A total reflection surface 23a is formed at the interface between the third layer 23 and the fourth layer 24. The critical angle of the total reflection surface 23a is 65.7°.

In the case of a conventional Fresnel lens sheet having a structure similar to that of the Fresnel lens sheet 20 of the present embodiment, when imaging light is projected by a projector at the projection distance of 1000 mm, a double image is conspicuously generated especially at a position 450 mm below the center. Here, the optical path of the incident light in the Fresnel lens sheet 20 of the present embodiment is described by showing the optical path of the incident light at the above-mentioned position in FIG. 4.

The incident light $L_{in}$ is incident on the lens sheet at an incident angle of 24.2° at the position 450 mm below the center, when the projection distance is 1000 mm. A portion $L_{r20}$ (reflected light) of the incident light $L_{in}$, which portion is reflected back at the light-emission surface 21b, is incident on the total reflection surface 23a at the angle of 67.5°.

Here, the critical angle of the total reflection surface 23a is 65.7°. Therefore, the reflected light $L_{r20}$, which is incident on the total reflection surface 23a at the angle of 67.5°, is totally reflected at the total reflection surface 23a and then emitted as the disoriented light $L_{out20}$.

The degree of displacement between the light-emission position of the emission light $L_{out}$ and that of the disoriented light $L_{out20}$ is approximately 7 pitches (0.7 mm) and the resulting double image is hardly recognized. At the same time, as the Fresnel lens sheet 20 including the base material 22 is sufficiently thick (t21+t23+t24+t22=3.2 mm), it can be held or supported easily.

In the present embodiment, the third layer 23 and the fourth layer 24 are provided between the lens layer 21 and the base material layer 22, and the total reflection surface 23a is further provided between the third layer 23 as a high refractive index layer and the fourth layer 24 as a low refractive index layer. Accordingly, the total reflection layer can be formed without depending on either the refractive index of the lens layer 21 or that of the base material layer 22. Therefore, for example, if polyester film or the like is used as the third layer 23, so that the third layer functions as a support, and the lens layer 21 is formed thereon, the lens layer 21 in a form of a thin film can be mass-produced in a highly efficient manner. By laminating the base material layer 22 onto the back surface of the obtained lens layer 21 structure by way of the fourth layer 24, the Fresnel lens sheet 20 can be produced easily. In this case, the fourth layer 24 may be formed by dissolving a plastic having a predetermined refractive index in an appropriate solvent and then applying the obtained coating solution to the third layer 23 or the base material layer 22 by coating. It is acceptable to use the aforementioned coating solution for forming the fourth layer 24 as an adhesive and attaching the third layer 23 and the base material layer 22 therewith.

(Second Embodiment)

Figure 6:
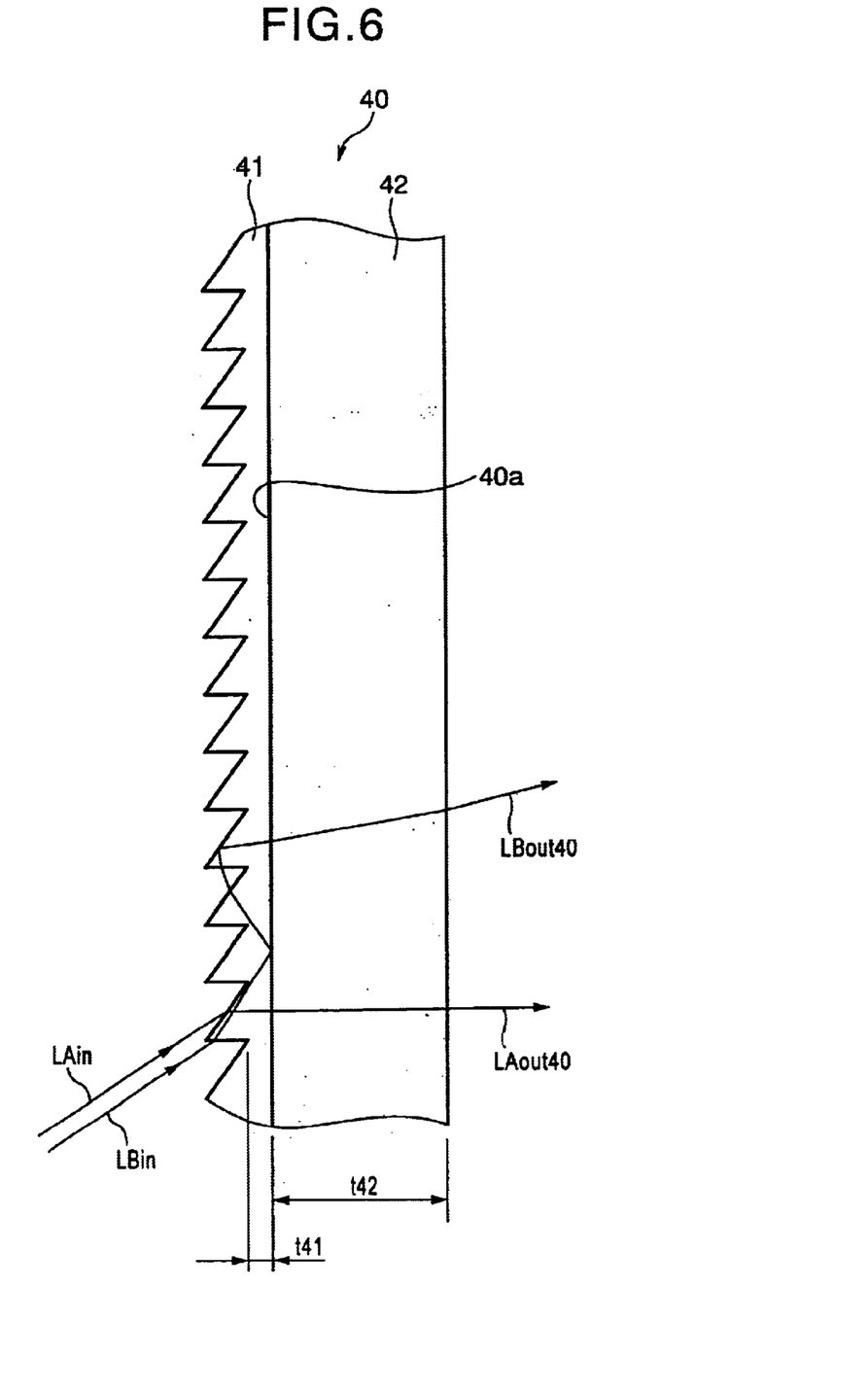
FIG. 6 is an explanatory view which shows one example of a second embodiment of a Fresnel lens sheet of the present invention.

FIG. 6 is an explanatory view which shows one example of a second embodiment of a Fresnel lens sheet of the present invention.

A Fresnel lens sheet 40 of the present embodiment includes a lens layer 41 and a base material layer 42. The size across corners and the focal length of the Fresnel lens sheet 40 are 50 inches (aspect ratio being 4:3) and 700 mm, respectively.

Imaging light is projected onto the Fresnel lens sheet 40 at the projection angle of 90° by a projector including a liquid crystal and a DLP (Digital Light Processor) and the like, from a position located on the optical path of the Fresnel lens sheet 40 with the projection distance of 700 mm. The Fresnel lens sheet 40 and a diffusion device/means (not shown in the Fig.) form a transmission-type projection screen.

The Fresnel lens sheet 40 includes a total reflection surface 40a at the interface between the lens layer 41 and the base material layer 42.

A Fresnel lens configuration having pitch (P) of 0.1 mm is formed at the light-emission side of the lens layer 41. The lens layer 41 has refractive index (n41) of 1.66. The thickness (t41) of the lens layer 41 measured from the bottom line of the notches thereof is 0.1 mm.

The base material layer 42 is a parallel-extending flat plate made of a fluorine-based resin whose plate thickness (t42) is 2 mm and the refractive index (n42) is 1.35, which functions as a low refractive index layer. In FIG. 6, the plate thickness and the like of the lens layer 41 and the base material layer 42 are shown in a manner that the ratio thereof is appropriately increased/decreased, so that understanding of the description is facilitated (such modification of the ratio of the plate thickness and the like are also carried out, in a similar manner, in other drawings of the present embodiment).

In a conventional Fresnel lens sheet having a structure similar to that of the Fresnel lens sheet 40 of the present embodiment, when imaging light is projected by a projector at the projection distance of 700 mm, a double image is conspicuously generated especially in the vicinity of a circle drawn as a locus of the position distanced by 450 mm from the center. Here, the optical path of the incident light in the Fresnel lens sheet 40 of the present embodiment is described by showing the optical path of the incident light at the above-mentioned position in FIGS. 6 and 7.

Figure 7:
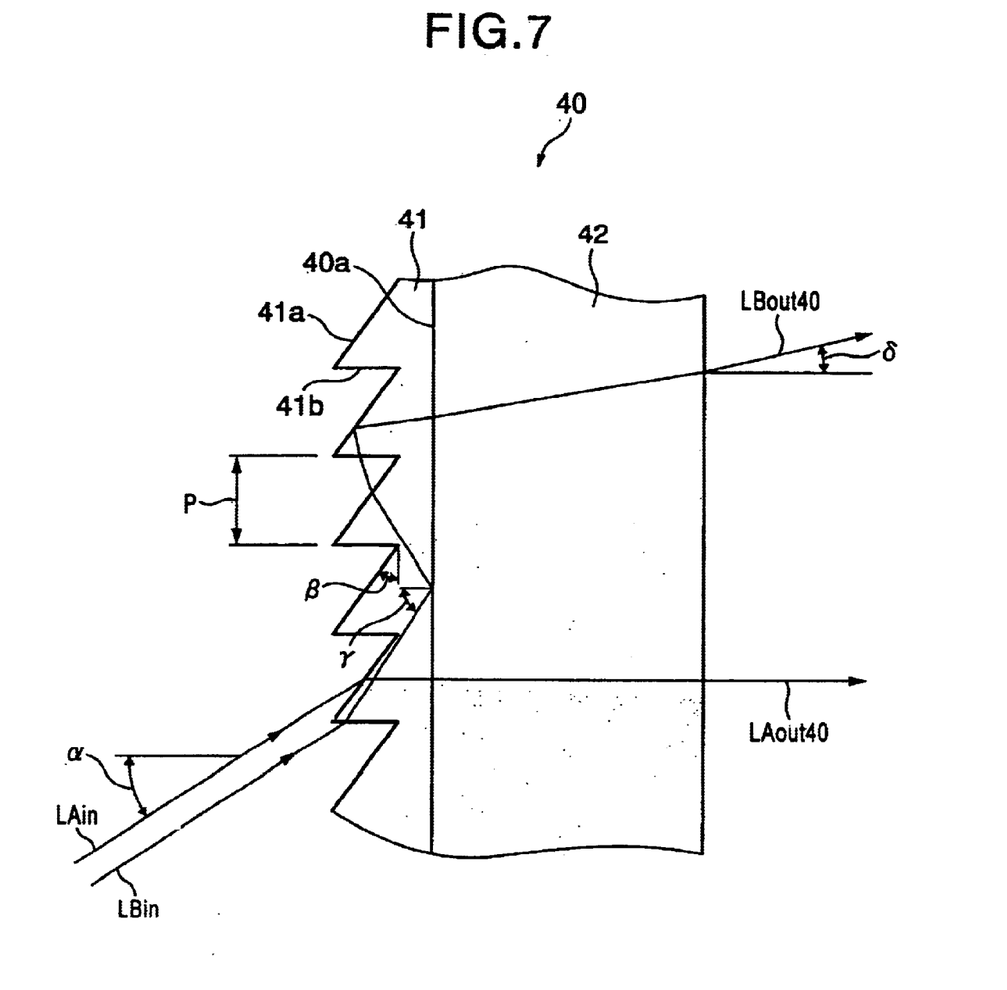
FIG. 7 is an enlarged view of a main portion of FIG. 6.

FIG. 7 is an enlarged view of a main portion of FIG. 6.

The incident light $LA_{in}$ and $LB_{in}$ are incident on the lens sheet at an incident angle ($\alpha$) of 32.735° in the vicinity of a circle drawn as a locus of the position distanced by 450 mm from the center, when the projection distance is 700 mm. The lens angle ($\beta$) at this position is 33.441°.

Among the light which is incident on the above-mentioned position, the incident light $LA_{in}$, which is incident on an (effective) incident surface 41a, is refracted as originally desired and emitted substantially toward the front as the emission light $LA_{out40}$.

On the other hand, the incident light $LB_{in}$, which is incident on an ineffective surface 41b, is refracted when the incident light $LB_{in}$ is incident on the ineffective surface 41b and then incident on a total reflection surface 40a at the incident angle ($\gamma$) of 59.553°. As the critical angle of the total reflection surface 40a is 54.415°, the incident light $LB_{in}$ is totally reflected at the total reflection surface 40a, subjected to additional refractions and reflections and is eventually emitted as the disoriented light $LB_{out40}$.

The degree of displacement between the light-emission position of the emission light $LA_{out40}$ and that of the disoriented light $LB_{out40}$ is reduced to 3 pitches (0.3 mm) or so because the lens layer is thin and the resulting double image is hardly recognized. At the same time, as the Fresnel lens sheet 40 is sufficiently thick (t41+t42=2.1 mm), the Fresnel lens sheet 40 can be held or supported easily.

In the present embodiment, the lens layer 41 is provided as a high refractive index layer having a relatively small thickness and the base material layer 42 is provided as a low refractive index layer having a relatively large thickness. Accordingly, a Fresnel lens sheet which has high strength, can be held/supported easily, and in which double image is not conspicuous, can be obtained.

(Modification of the Second Embodiment)

Figure 8:
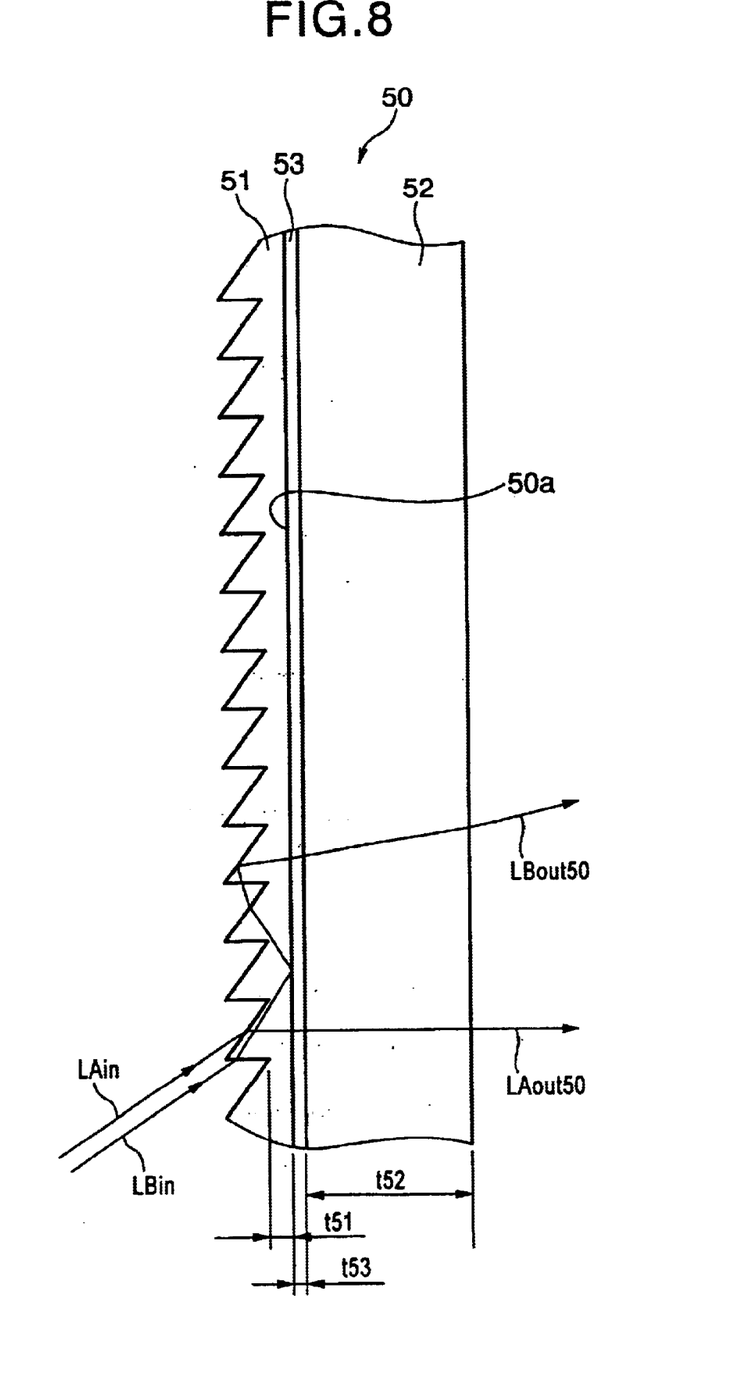
FIG. 8 is an explanatory view which shows another example of the second embodiment of the Fresnel lens sheet of the present invention.

FIG. 8 is a view which shows another modification of the second embodiment of the Fresnel lens sheet of the present invention.

A Fresnel lens sheet 50 of the present embodiment includes a third layer 53 between a lens layer 51 and a base material layer 52. The size across corners and the focal length of the Fresnel lens sheet 50 are 50 inches (aspect ratio being 4:3) and 700 mm, respectively.

A Fresnel lens configuration having pitch (P) of 0.1 mm is formed at the light-emission side of the lens layer 51. The lens layer 51 has refractive index (n51) of 1.6. The thickness (t51) of the lens layer 51 measured from the bottom line of the notches thereof is 0.1 mm.

The base material layer 52 is a parallel-extending flat plate made of acrylic resin whose plate thickness (t52) is 2 mm and the refractive index (n52) is 1.49.

The third layer 53 is provided between the lens layer 51 and the base material layer 52, has refractive index (n52) of 1.25 and layer thickness (t53) of 0.01 mm and functions as a low refractive index layer.

A total reflection surface 50a is formed at the interface between the lens layer 51 and the third layer 53. The critical angle of the total reflection surface 50a is 51.375°.

Figure 9:
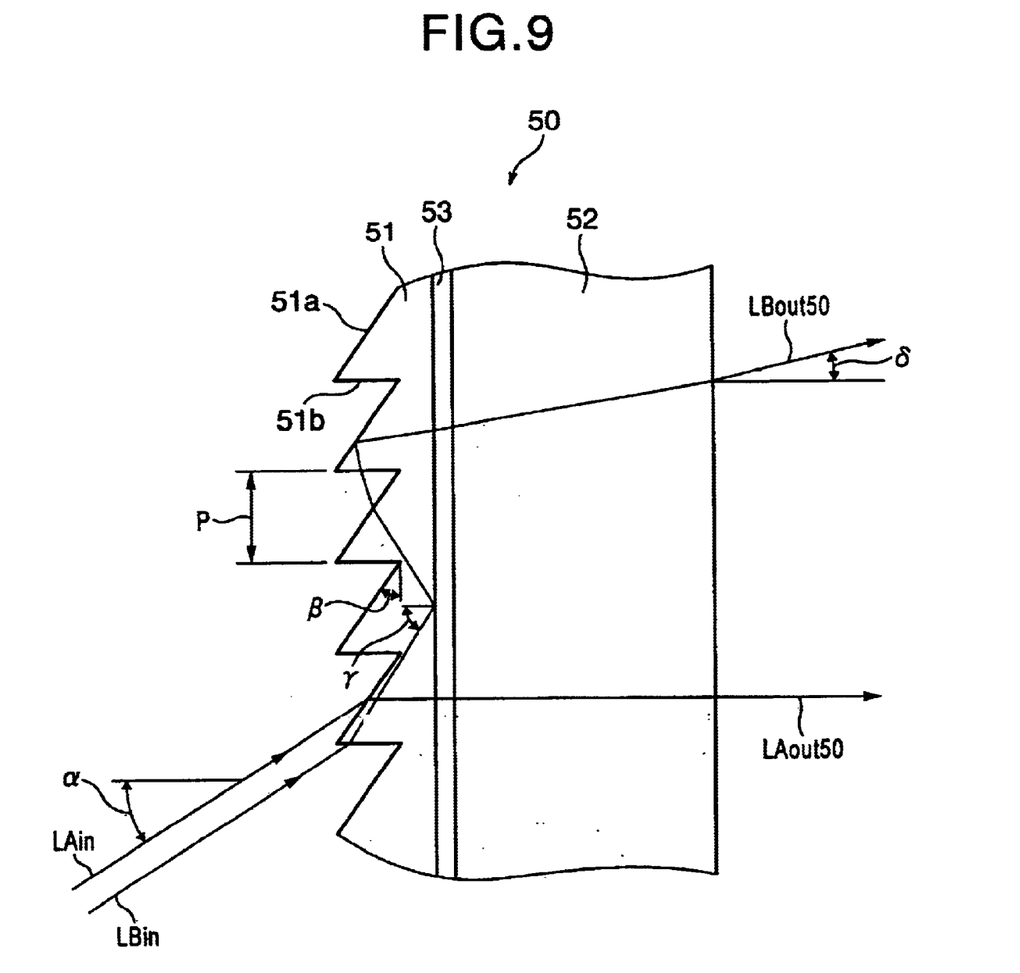
FIG. 9 is an enlarged view of a main portion of FIG. 8.

In the present modification, in a manner similar to that of the first example (the Fresnel lens sheet 40) of the second embodiment, the optical path of the incident light in the Fresnel lens sheet 50 of the present embodiment is described by showing, in FIGS. 8 and 9, the optical path of the incident light in the vicinity of a circle drawn as a locus of the position distanced by 450 mm from the center, where a conspicuous double image is particularly generated.

FIG. 9 is an enlarged view of a main portion of FIG. 8.

The incident light $LA_{in}$ and $LB_{in}$ are incident on the lens sheet at an incident angle ($\alpha$) of 32.735° in the vicinity of a circle drawn as a locus of the position distanced by 450 mm from the center, when the projection distance is 700 mm. The lens angle ($\beta$) at this position is 35.475°.

Among the light which is incident on the above-mentioned position, the incident light $LA_{in}$, which is incident on an (effective) incident surface 51a, is refracted as originally desired and emitted substantially toward the front as the emission light $LA_{out50}$.

On the other hand, the incident light $LB_{in}$, which is incident on an ineffective surface 51b, is refracted when the incident light $LB_{in}$ is incident on the ineffective surface 51b and then incident on a total reflection surface 50a at the incident angle ($\gamma$) of 58.282°. As the critical angle of the total reflection surface 50a is 51.375°, the incident light $LB_{in}$ is totally reflected at the total reflection surface 50a, subjected to additional refractions and reflections and is eventually emitted as the disoriented light $LB_{out50}$.

The degree of displacement between the light-emission position of the emission light $LA_{out50}$ and that of the disoriented light $LB_{out50}$ is approximately 3 pitches (0.3 mm) and the resulting double image is hardly recognized. At the same time, as the Fresnel lens sheet 50 is sufficiently thick (t51+t52+t53=2.11 mm), the Fresnel lens sheet 50 can be held or supported easily.

In the present embodiment, the third layer 53 as a low refractive index layer is provided between the lens layer 51 and the base material layer 52 and a surface of the third layer 53 functions as the total reflection surface 50a. Accordingly, the total reflection surface can be formed without depending on either the refractive index of the lens layer 51 or that of the base material layer 52. Therefore, for example, the third layer 53 can be formed by coating, which allows selection of the material of the third layer from a variety of substances.

Figure 10:
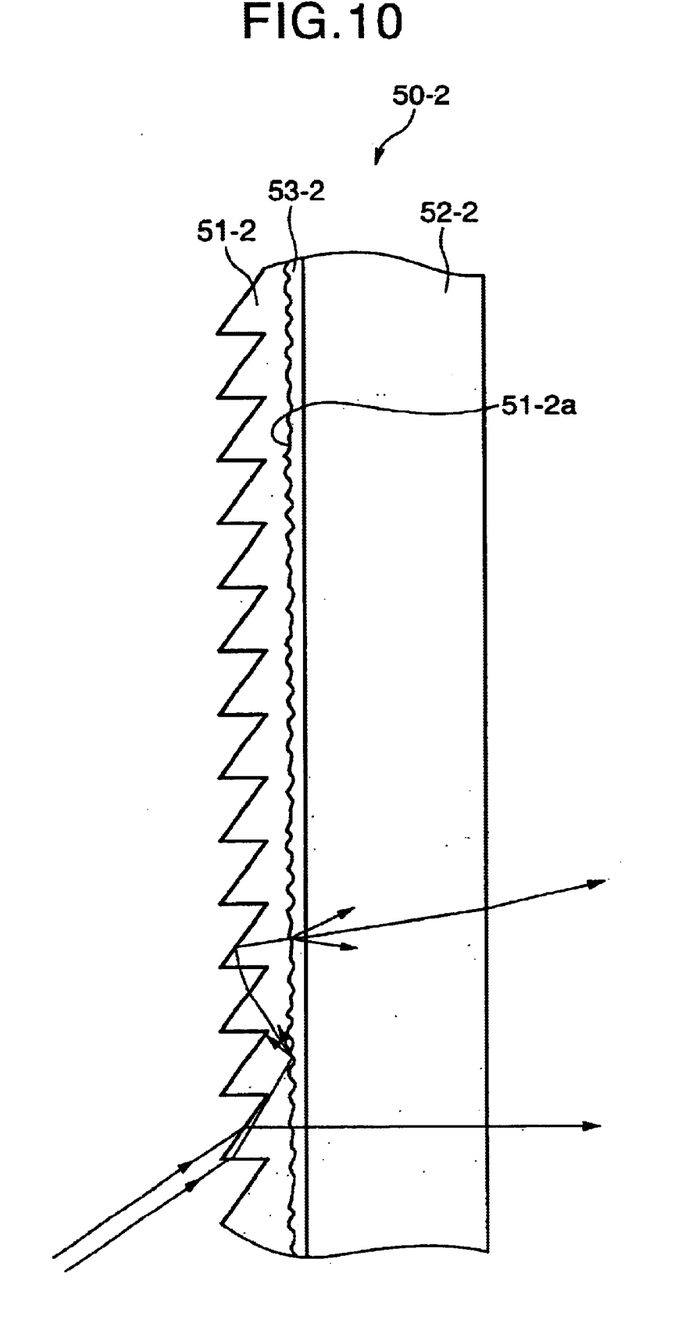
FIG. 10 is a view which shows a modification of the second embodiment.

Further, the Fresnel lens sheet may be produced in such manner that a low refractive index layer with a thickness of 0.01 mm (the refractive index thereof is 1.25) which corresponds to the third layer 53 is formed on a support such as a polyester film having thickness of 0.1 mm or so (the refractive index thereof is 1.59) by coating method, and a Fresnel lens (the refractive index thereof is 1.6) is formed on the low refractive index layer, and thereafter a base material layer (the refractive index thereof is 1.49) made of an acrylic resin having thickness of 3 mm or so is laminated. According to such manner, production of the low refractive index layer and the Fresnel lens can be continuously performed in a form of a web, whereby productivity is significantly increased. (Another modification of the second embodiment) FIG. 10 is a view which shows another modification of the second embodiment. A Fresnel lens sheet 50-2 shown in FIG. 10 has a structure in which minute projections and dents are formed at the interface 51-2a between a lens layer 51-2 and a third layer 53-2, so that the interface has a diffusion configuration. As a result, light which generates double image is diffused and the double image, if it is generated, can be made further less conspicuous.

By designing the Fresnel lens sheet of the present embodiment as described above, generation of a double image can further be reduced.

(Other Modifications)

The present invention is not restricted to the above-described embodiments and modifications, and various modifications and changes can be made to the present invention within the scope thereof.

Figure 5:
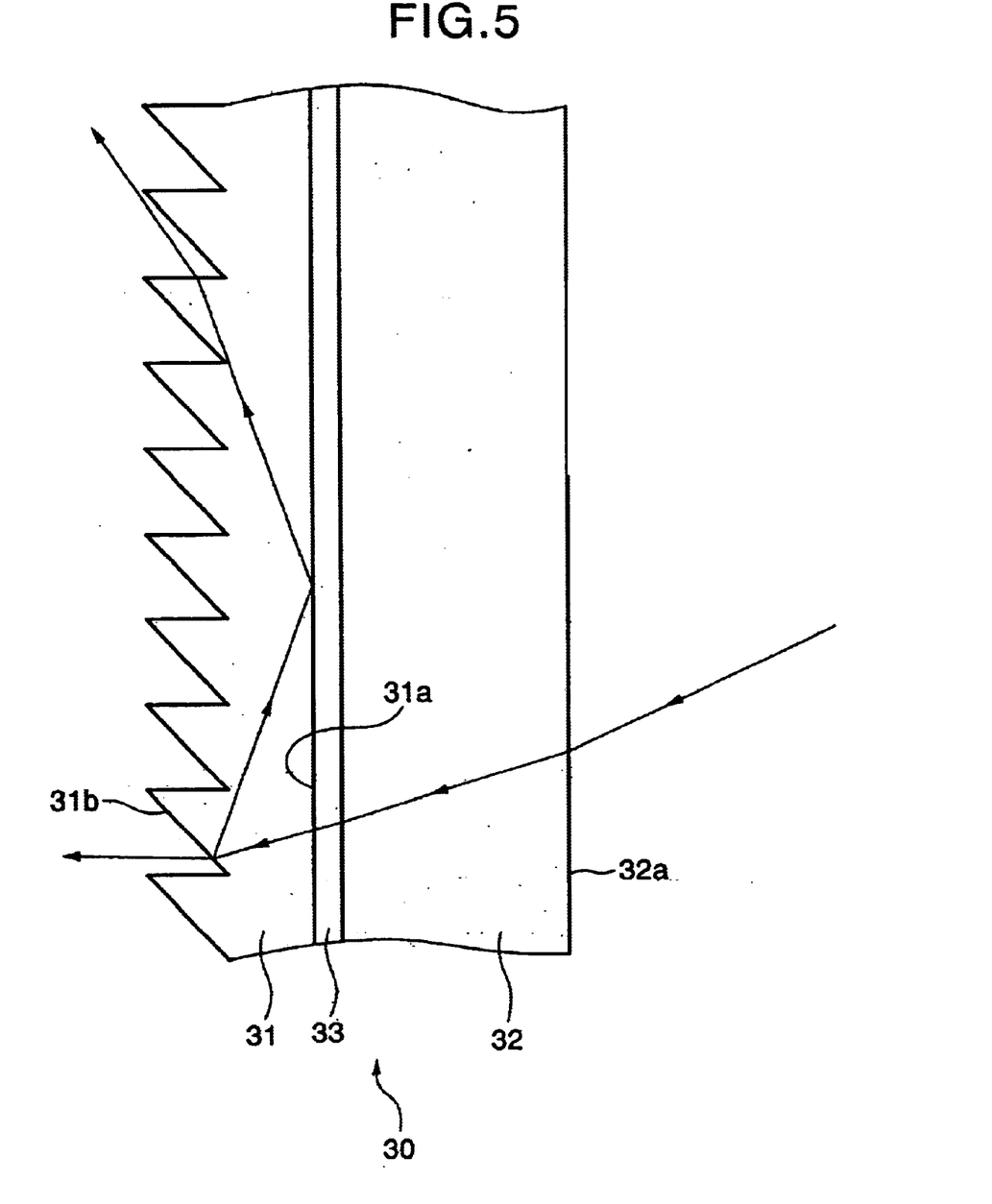
FIG. 5 is a view which shows a modification of the layered structure including a modification of a position at which a total reflection surface is provided.

For example, the layer structure of the Fresnel lens sheet of the present invention is not restricted to the layer structures described in the first and the second embodiments. In the first embodiment, it suffices if the total reflection surface which faces the light-emission side is formed between the incident surface and the light-emission surface. Therefore, as shown in FIG. 5, it is acceptable that a third layer 33 whose refractive index is smaller than that of the lens layer 31 is provided between the lens layer 31 and the incident layer 32 and the total reflection surface 31a is formed as a surface of the third layer 33.

Further, in the second embodiment, it suffices if the total reflection surface which faces the light-incident side is formed between the incident surface and the light-emission surface. Therefore, it is acceptable that the layered structure includes four or more layers. It is particularly preferable that the total reflection surface is provided at a position closer to the lens layer side than a position of the interface at which the base material layer is in contact with a third or the other adjacent layer.

As a modification of each embodiment, examples in which an interface has a diffusion configuration and/or a diffusion material is included in at least one layer disposed at a side to which the total reflection surface faces are described above. However, the present invention is not restricted to these examples and, in the cases of layered structures of other types, an interface having a diffusion configuration and/or a layer containing the diffusion material may be disposed at an optional position.

In the above-mentioned embodiments, the Fresnel lens sheet and a diffusion device or means (not shown) combined therewith may be applied to a transmission-type projection screen. However, the present invention is not restricted to such a structure, and it is acceptable that a diffusion device or means is formed by a method selected from the group consisting of: adding a diffusion material inside the Fresnel lens sheet; providing a projection-dent configuration at the total reflection surface or another interface in the layered structure; roughening a light-emission surface; and forming a lenticular configuration at a light-emission surface, so that the transmission-type projection screen is constituted of only the Fresnel lens sheet.

What is claimed is:

1. A Fresnel lens sheet comprising a layered structure provided with at least a base material layer, a lens layer formed into a Fresnel lens configuration, an incident surface on which projection light is incident and an light-emission surface from which the projection light is emitted, the incident surface being disposed on either the lens layer side or the base material layer side and the light-emission surface being disposed on a side opposite to the incident surface, wherein a total reflection surface is disposed in the layered structure at a position between the incident surface and the light-emission surface, the total reflection surface totally reflecting a portion of projection light proceeding on an optical path in a direction from the lens layers side toward the base material layer side, wherein a distance between the total reflection surface and a surface of the base material layer side is larger than a distance between the total reflection surface and a bottom line of the notches of the lens layer.

2. A Fresnel lens sheet according to claim 1 wherein the base material layer is provided as a layer having the incident surface, and the lens layer is provided further toward the light-emission surface side than the base material layer, and the total reflection surface totally reflects a portion of the projection light which is reflected by the light-emission surface.

3. A Fresnel lens sheet according to claim 2, wherein the Fresnel lens sheet further comprises a low refractive index layer which has a predetermined refractive index and a high refractive index layer which has a refractive index higher than the refractive index of the low refractive index layer and is adjacent to the light-emission side of the low refractive index layer, and the total reflection surface is a surface at which the low refractive index layer is in contact with the high refractive index layer.

4. A Fresnel lens sheet according to claim 3, wherein the low refractive index layer is the base material layer and the high refractive index is the lens layer.

5. A Fresnel lens sheet according to claim 2, wherein the distance between the total reflection surface and the light-emission surface is smaller than the distance between the total reflection surface and the incident surface.

6. A Fresnel lens sheet according to claim 2, wherein the total reflection surface has a diffusion configuration constituted of minute projections and dents.

7. A Fresnel lens sheet according to claim 2, wherein at least one of the layers provided between the total reflection surface and the light-emission surface contains a diffusion material which diffuses light.

8. A Fresnel lens sheet according to claim 1 wherein the lens layer is provided as a layer having the incident surface, and the base material layer provided further toward the light-emission surface side than the lens layer, and the total reflection surface totally reflects a portion of the projection light which is incident on the lens layer.

9. A Fresnel lens sheet according to claim 8, wherein the total reflection surface totally reflects a portion of the projection light incident on an ineffective surface of the lens layer.

10. A Fresnel lens sheet according to claim 8, wherein the Fresnel lens sheet further comprises a high refractive index layer which has a predetermined refractive index and a low refractive index layer which has a refractive index lower than the refractive index of the high refractive index layer and is adjacent to the light-emission side of the high refractive index layer, and the total reflection surface is a surface at which the high refractive index layer is in contact with the low refractive index layer.

11. A Fresnel lens sheet according to claim 10, wherein the low refractive index layer is the base material layer and the high refractive index layer is the lens layer.

12. A Fresnel lens sheet according to claim 8, wherein the distance between the total reflection surface and the incident surface is smaller than the distance between the total reflection surface and the light-emission surface.

13. A Fresnel lens sheet according to claim 8, wherein the total reflection surface has a diffusion configuration constituted of minute projections and dents.

14. A Fresnel lens sheet according to claim 8, wherein at least one of the layers provided between the total reflection surface and the light-emission surface contains a diffusion material which diffuses light.

15. A transmission-type projection screen provided with a Fresnel lens sheet, wherein the Fresnel lens sheet comprises a base material layer, a lens layer formed in to a Fresnel lens configuration, a total reflection surface which is disposed at a position between an incident surface and an light-emission surface and totally reflects a portion of projection light proceeding on an optical path in a direction from the lens layer side toward the base material layer side, and wherein the Fresnel lens sheet is further comprises one diffusion means selected from the group consisting of a diffusion material added inside the Fresnel lens sheet, an interface between layers which constitute the Fresnel lens sheet formed into a projection-dent configuration, a light-emission surface formed into a rough face, and a light-emission surface formed into a lenticular configuration.

16. A Fresnel lens sheet according to claim 1, wherein the base material layer comprising a layer made of a plate.

* * * * *